Patented Feb. 10, 1942

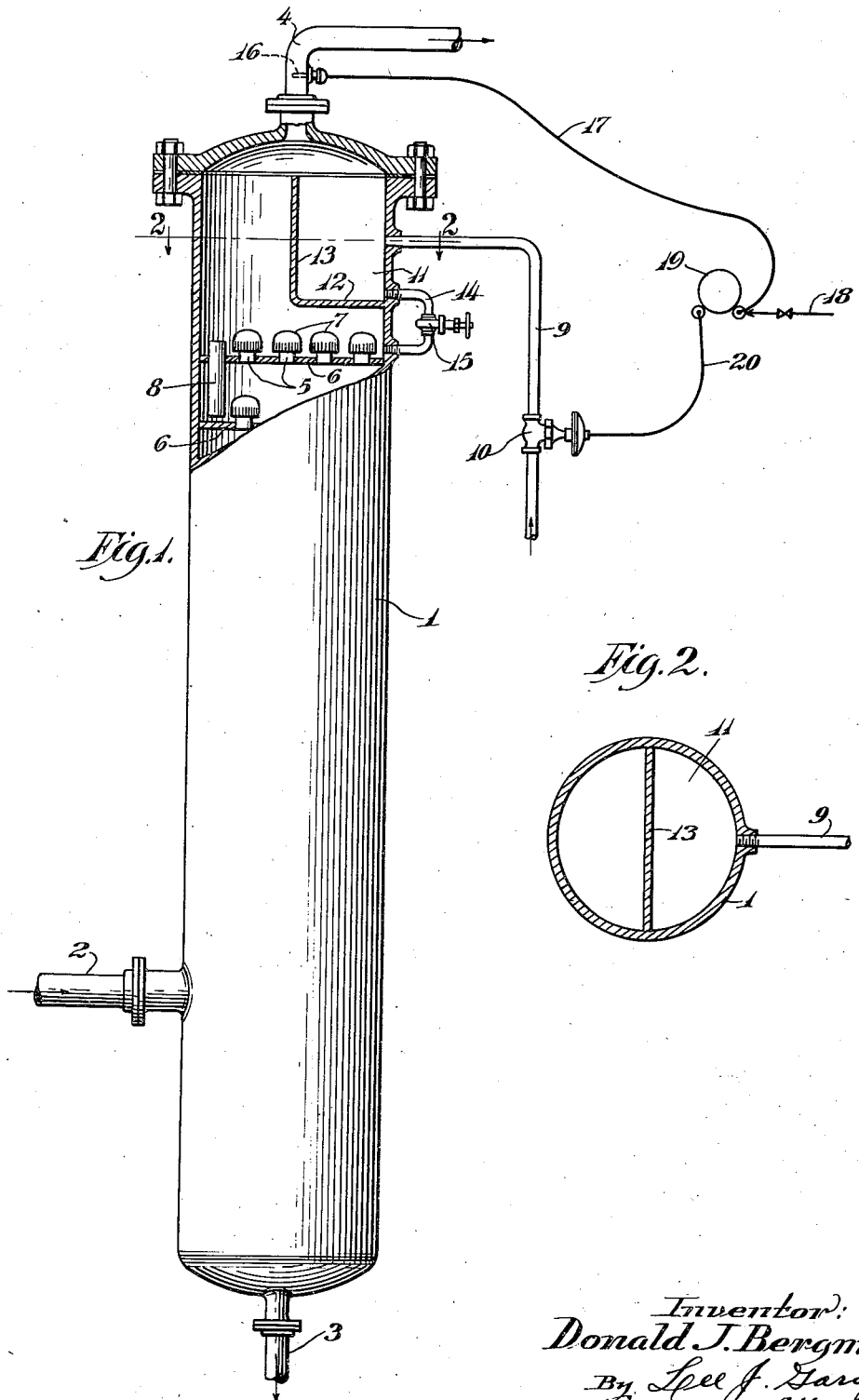

2,272,261

UNITED STATES PATENT OFFICE 2,272,261

FRACTIONATION

Donald J. Bergman, Chicago, Ill., assignor to Universal Oil Products Company, Chicago, Ill., a corporation of Delaware Application April 24, 1940, Serial No. 331,313

4 Claims. (Cl. 261—39)

The invention relates to an improved means of controlling temperatures in fractionation, which may be employed to advantage in the fractional condensation of either normally gaseous or normally liquid mixtures in heated vaporous state to effect their separation into selected components.

It is common practice in efficient fractionating operations to supply refluxing and cooling liquid to the upper portion of the fractionating column in regulated quantities, to control the temperature of the fractionated vaporous stream leaving the column and thus control its end-boiling point. Variations in the temperature and/or quantity of the heated vaporous stream entering the column calls for variations in the quantity of refluxing and cooling liquid supplied to the upper portion of the column if an overhead stream of constant end-boiling point is to be produced. Without compensating changes in the quantity of refluxing and cooling liquid employed, changes in the quantity of heat supplied to the column and/or in the composition of the mixture in the lower portion of the column will be reflected in changes in the temperature and composition of the overhead vaporous stream. Manual or automatic control of the quantity of cooling and refluxing liquid supplied to the fractionating column, in response to minor changes in the temperature of the overhead vaporous stream leaving the column, is ordinarily employed to compensate for changing conditions within the column before they effect any substantial change in the temperature and composition of the overhead vaporous stream.

I have observed that sudden changes in the temperature at the bottom of the column are the exception rather than the rule in most fractionating operations and that they are apt to be of a temporary nature and not of substantial magnitude. Furthermore, due to the fact that the fractionating column ordinarily has a rather large storage capacity such changes as occur in the heat content of the vaporous stream entering the column are modified and made more gradual within the column due to commingling of the entering vapors with the relatively large volume of vapors and liquid present in the column. Therefore, the relatively wide temperature changes and any changes of a permanent or prolonged nature, which are the only type than can be satisfactorily compensated for by either manual control or present inexpensive automatic control equipment, take place rather gradually.

I have also observed, on the other hand, that changes in the quantity of refluxing and cooling liquid, in an attempt to compensate for minor variations in the temperature of the overhead vaporous stream, as conventionally accomplished when a relatively inexpensive type of automatic control equipment, such as the present invention utilizes successfully, is employed, are quite abrupt and, in most cases, effect a too pronounced and rapid change in the opposite direction which, at least temporarily, upsets the smooth operation of the fractionating equipment.

To correct this difficulty, the present invention provides storage space within or adjacent the fractionating column for the refluxing and cooling liquid wherefrom the latter flows through an orifice onto the top fractionating tray and thus into contact with the vapors undergoing fractionation in the upper portion of the column. Variations in the quantity of refluxing and cooling liquid supplied to this storage space or reservoir may be accomplished by either automatic or manual control in the conventional manner (e. g., in response to minor variations in the temperature of the vaporous stream leaving the fractionator) but due to the wide band throttling effect of the orifice abrupt changes in the rate at which refluxing and cooling liquid is supplied to the reservoir will be transmitted more gradually to the materials undergoing fractionation and abrupt changes in the temperature of these vapors is thereby prevented. This relatively simple but important improvement to conventional fractionating equipment serves to stabilize or smooth out its operation and helps to minimize the well known hunting tendency of the inexpensive automatic control equipment. Its action may be compared to that of relatively thick refractory walls in a heater which store up heat so that abrupt changes in firing conditions are not immediately noticeable and satisfactory operation may be maintained even with control equipment of the on-and-off type.

Although, as previously indicated, the improvements provided by the invention may be utilized to advantage in the continuous fractionation of any mixture of heated vaporous or gaseous materials wherein it is desired to produce an overhead fraction of substantially non-varying characteristics, a description of the improvement, as adapted to use with conventional fractionating equipment of the type commonly employed in oil distilling or cracking equipment, will serve to illustrate its features and advantages and various other adaptations and modifications of the apparatus illustrated will be readily apparent to those familiar with the art.

In the accompanying diagrammatic drawing Figure 1 is an elevational view, shown partially in section, of one specific form of fractionating equipment incorporating the apparatus features of the invention and with which the improved method of operation provided by the invention may be accomplished. Figure 2 represents a horizontal section through the fractionating column taken along a plane indicated by the line 2—2 in Figure 1.

Referring to the drawing, the main body of the fractionating column is designated by the reference numeral 1 and comprises a vertically disposed cylindrical shell designed to withstand the required operating temperatures and pressures. The column is provided with a suitable inlet connection 2 through which a mixture of heated hydrocarbon vapors and gases is supplied from preceding vaporizing or cracking equipment not pertinent to the present invention. An outlet connection 3 is provided at the lower end of the column for removing condensate or bottoms therefrom and a vapor outlet connection 4 leading to suitable condensing and collecting equipment, not illustrated, is provided at the upper end of the column.

Any conventional means such as packing, perforated trays, bubble decks and the like or any combination of such means may be employed for obtaining intimate contact between the ascending vapors and gases in the column and the descending refluxing liquid. In the particular case here illustrated, bubble decks are shown which comprise a plurality of vapor risers 5 extending through a relatively flat tray or deck 6 and topped by bubble caps 7. A suitable level of liquid is carried on the bubble decks and the vapors passing through serrations in the skirts of the bubble caps intimately contact the liquid on the trays. The liquid passes from each tray to the next adjacent lower tray through suitable downpipes, such as indicated at 8, which maintain the desired liquid level on each tray or deck.

The fractionating equipment so far described is conventional and, in conventional practice, refluxing liquid is directed through a line 9 containing control valve 10 into the upper portion of the column and is either sprayed into the vapor space in any desired manner or is introduced directly onto the tray or deck immediately beneath its point of introduction into the column. In the present invention this manner and means of supplying refluxing liquid to the upper portion of the column is modified and improved by providing a storage reservoir or accumulator 11 extending across a portion of the upper end of the column and into which the refluxing liquid from line 9 is intermittently introduced by opening and closing valve 10.

In the particular case here illustrated, accumulator 11 is formed by a portion of the cylindrical wall of the column, a relatively flat sheet or plate 12 comprising a segment of a circle corresponding in diameter to the internal diameter of the column and secured along its circular edge to the cylindrical wall of the column, and a vertically extending edge plate 13 secured to member 12 along the straight edge of the latter and secured at its ends to the cylindrical wall of the column. Many other specific forms of reservoir or accumulator may, of course, be employed without departing from the scope of the invention and, when desired, the accumulator may be disposed exterior to but adjacent the upper portion of the column. With the specific form of accumulator here illustrated, refluxing liquid is discharged therefrom through conduit 14 having suitable means, such as valve 15, disposed therein for varying the opening therethrough, the liquid passing from accumulator 11 through conduit 14 and valve 15 onto the bubble tray immediately beneath the accumulator.

It is also within the scope of the invention instead of providing a valved conduit, such as 14, disposed outside the fractionating column to provide a fixed or variable orifice or weir in the lower portion of the accumulator through which liquid will flow from the latter to the bubble deck thereunderneath. In any case, the means through which the flow of liquid from the accumulator into contact with the vapors undergoing fractionation is established is, in effect, an orifice or weir which may within the scope of the invention be either fixed or manually variable. An orifice, since it gives smaller variations in flow with variations in the head of liquid in the accumulator, as compared to weirs of various forms, is preferably employed and, for the reason which will be later explained is preferably variable. To be most useful, the size of the orifice opening should be adjustable from outside the column while the latter is in operation. Many specific means of accomplishing this, other than that illustrated, will be readily apparent to a skilled mechanic, the specific means illustrated being one of the simplest and most readily applied of the many possible variations.

The size of the orifice opening, either fixed or variable, is such that, with a normal level of liquid in the accumulator the rate of flow therethrough will be equivalent to the normal demand of the fractionating column for refluxing and cooling liquid and less than the rate at which cooling and refluxing liquid is supplied to the storage reservoir when valve 10 is open. Thus, while valve 10 remains open refluxing and cooling liquid is supplied to accumulator 11 at a more rapid rate than that at which it is discharged from the accumulator through the orifice and the liquid level in the accumulator will rise and, by increasing the head of liquid above the orifice, increase the rate of flow therethrough and increase the quantity of refluxing and cooling liquid brought into contact with the vapors undergoing fractionation. On the other hand, while valve 10 remains closed no cooling and refluxing liquid is supplied to the accumulator and the level therein recedes, thereby gradually decreasing the flow through the orifice and decreasing the quantity of refluxing and cooling liquid brought into contact with the vapors undergoing fractionation.

Valve 10, which controls the flow of refluxing and cooling liquid into accumulator 11, is preferably, as in the case here illustrated, an automatic control valve of any desired type operated through a controller indicated in the drawing at 19 which functions to open and close valve 10 in response to minor variations in the temperature of the stream of fractionated vapors leaving the upper portion of the fractionator. Preferably, the controller is one of the several well known forms of such instruments employing a mechanism having temperature detecting means highly sensitive to relatively small temperature variations in order to reduce time lag in the control mechanism and maintain the temperature and composition of the fractionated vaporous stream at a relatively constant value. In the particular case here illustrated, valve 10 is a diaphragm control valve of the off-and-on type operated in one direction by fluid pressure transmitted to one side of the diaphragm through line 20 from controller 19 and operated in the opposite direction by a spring or other loading mechanism on the opposite side of the diaphragm when pressure in line 20 is relieved. Impulses are transmitted from a pyrometer or other suitable temperature sensitive device 16 in line 4 to controller 19 through line 17. Air or other suitable fluid for actuating the valve is admitted to the controller through line 18. The controller is set to open valve 10 when the impulses transmitted thereto from member 16 indicate that the temperature of the fractionated vaporous stream is slightly above that desired and to close valve 10 when the impulses transmitted to the controller from member 16 indicate that the temperature of the fractionated vaporous stream is slightly below that desired.

When the heat supplied to the fractionating column is increased by an increase in the temperature and/or quantity of vapors supplied thereto through line 2, an unbalanced condition is momentarily created within the column until it is reflected in a slight increase in the temperature of the fractionated vaporous stream leaving the upper portion of the column. When this occurs, the controller will open valve 10 and admit cooling and refluxing liquid to accumulator 11, raising the liquid level in the accumulator and increasing the flow of liquid therefrom into contact with the vapors undergoing fractionation until this increased rate of flow corresponds to or slightly exceeds that required to reestablish a temperature balance within the column. Then, as the new demand of the column for additional cooling and refluxing liquid is exceeded to the extent that the temperature of the fractionated vaporous stream leaving the column falls slightly below the set point of the controller, the latter operates to close valve 10 and stop the supply of cooling and refluxing liquid to accumulator 11. Obviously, when the heat supplied to the fractionating column decreases, the control mechanism functions in the reverse direction to stop the supply of refluxing and cooling liquid to the accumulator and gradually decrease the rate of flow therefrom as the liquid level in this zone recedes until the rate of flow corresponds to the new diminished requirements of the column for refluxing and cooling liquid.

It will be apparent from the above that, due to the storage capacity of the reservoir and the wide band throttling effect of the orifice, the sudden surge of liquid into accumulator 11, when valve 10 is opened, will not effect a pronounced increase in the quantity of refluxing and cooling liquid brought into contact with the vapors undergoing fractionation and will not immediately effect a pronounced change in the temperature of the fractionated vaporous stream leaving the column. The change will be gradual and the rate of flow through the orifice will be accelerated as the level of liquid rises in the accumulator. Similarly, when valve 10 is abruptly closed the rate of flow through the orifice will be gradually decreased and a decelerating rate of flow will occur through the orifice as the liquid level in the accumulator recedes. Thus, it will be apparent that by providing an accumulator for refluxing and cooling liquid in or adjacent the upper portion of the fractionating column, I provide a compensating factor for the vapor and liquid storage capacity of the column and the accelerating and decelerating characteristics of the orifice discharge from the accumulator, in combination with the storage capacity of the accumulator, gives a wide band throttling effect in controlling the top temperature of the column which obviates rapid and wide fluctuations in the top temperature due to the relatively abrupt changes, obtained by conventional means, in the rate at which cooling and refluxing liquid is supplied to the column.

Due to the number of variable factors to be considered, determination of the proper size and storage capacity of the accumulator and the required size of orifice for any given fractionating column is not susceptible to accurate calculation. For this reason, it is preferable to roughly calculate the required size of the storage reservoir and the orifice, based on the average quantity of cooling and refluxing liquid required to balance temperatures in the particular column under consideration, and to provide an accumulator of ample capacity to satisfy the expected maximum requirements of the column with an orifice of ample size for this maximum and with means for varying the area of the latter, whereby to vary the average liquid level in the accumulator.

For example, in designing a 5 foot diameter fractionating column embodying the features of the invention, wherein the normal demand for refluxing and cooling liquid is computed to be 40 gallons per minute, I have provided an accumulator for the refluxing and cooling liquid which extends over one-half the cross-sectional area of the column and, assuming that the average head of liquid in the accumulator is 1 foot, the orifice opening required to deliver 40 gallons per minute of liquid from the accumulator has an area of 2.67 square inches. Since I contemplate using a relatively inexpensive and simple control mechanism of the off-and-on type, the rate of flow of cooling and refluxing liquid into the storage reservoir will vary from zero, when valve 10 is closed, to 200% (80 gallons per minute) of the normal demand (40 gallons per minute) of the column when valve 10 is open and closed during equal intervals of time. The length of the operating cycle of the controller from closed through open to closed position of valve 10 will, of course, vary with varying conditions in the column as will the relative length of the cycle time during which the valve is in an open position and a closed position. Assuming an average cycle time of 1 minute divided into 30 second intervals during which the valve is open and closed, a 1 foot head of liquid in the accumulator gives a storage capacity of 1.8 minutes at normal demand and under normal conditions the variation in the height of liquid is about 25% of its normal height. This 25% change in the head of liquid above the orifice will vary the flow therethrough approximately 6%, plus and minus, of the required normal flow of 40 gallons per minute. From past experience, I believe this relatively small variation will give the results desired and the wide band throttle effect of the orifice is demonstrated by a comparison of this figure with the variation of the rate of flow of liquid to the accumulator which is 100% plus and minus of the normal demand of the column.

In view of the above I have, in designing this particular column, provided an accumulator which will accommodate a 3 foot head of liquid and have provided an orifice which may be varied in area from zero to approximately 4 square inches. With this ample storage capacity and ample maximum and minimum orifice opening, the normal height of the liquid in the accumulator may be varied by the operator in the field to obtain conditions approaching the optimum by adjusting the orifice opening. If the temperature recording instrument in the controller indicates rapid cyclic fluctuations of considerable amplitude in the temperature of the overhead vaporous stream, the remedy is to increase the level in the storage reservoir by decreasing the size of the variable orifice. If, on the other hand, there are long time variations in this temperature of considerable amplitude, the remedy is to decrease the level in the storage reservoir by increasing the size of the variable orifice. The ideal condition, which may be closely approached by adjusting the orifice opening, is a minimum deviation of the temperature of the fractionated vaporous stream regardless of the length of the operating cycle of the controller and average height of liquid in the accumulator.

I claim:

1. In combination with a fractionating apparatus having a vapor inlet, an outlet for a stream of fractionated vapors and means within the fractionating apparatus for contacting refluxing and cooling liquid with the vapors undergoing fractionation, an accumulator providing with a conduit for supplying refluxing and cooling liquid thereto and having an orifice through which refluxing and cooling liquid may flow by gravity from the lower portion of the accumulator into contact with the vapors undergoing fractionation adjacent said vapor outlet, a temperature sensitive device disposed adjacent said vapor outlet to contact the outgoing stream of fractionated vapors, said temperature sensitive device communicating with a controller and the controller being operatively connected with a valve in said conduit to open and close the same in response to minor variations in the temperature of said outgoing stream of fractionated vapors.

2. In combination with a fractionating column having a vapor inlet adjacent its lower end, an outlet for fractionated vapors adjacent its upper end and means disposed within said column for contacting the vapors undergoing fractionation therein with cooling and refluxing liquid, an accumulator for refluxing and cooling liquid disposed adjacent the upper end of said fractionating column, said accumulator being provided with a variable orifice through which communication is established between the lower portion of said accumulator and the upper portion of said fractionating column, means including a valved conduit for supplying refluxing and cooling liquid to the accumulator, a temperature sensitive element disposed adjacent said vapor outlet to contact the outgoing stream of fractionated vapors, means for transmitting impulses resulting from minor changes in the temperature of said outgoing stream of fractionated vapors to a controller, said controller being operatively connected with said valve to open and close the same in response to said impulses.

3. In a fractionator, means for controlling the temperature thereof comprising an accumulator in said fractionator having an inlet conduit provided with a valve and a variable outlet orifice and a temperature sensitive device in contact with fluids in said fractionator adapted to control the opening and closing of said valve in accordance with variations in the temperature of the fluid in said fractionator.

4. In a fractionator, means for controlling the temperature thereof comprising an accumulator in said fractionator having an inlet conduit provided with a valve, said accumulator having means for conveying fluid therefrom into contact with fluid in said fractionator and a temperature sensitive device in contact with vapors in said fractionator adapted to control said valve.

DONALD J. BERGMAN.